A. LOOMIS.
MOTOR VEHICLE.
APPLICATION FILED OCT. 26, 1912.
1,189,590.
Patented July 4, 1916.
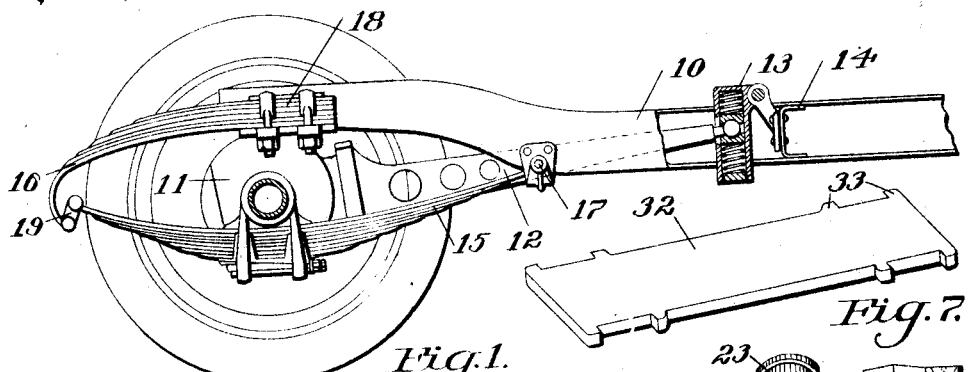
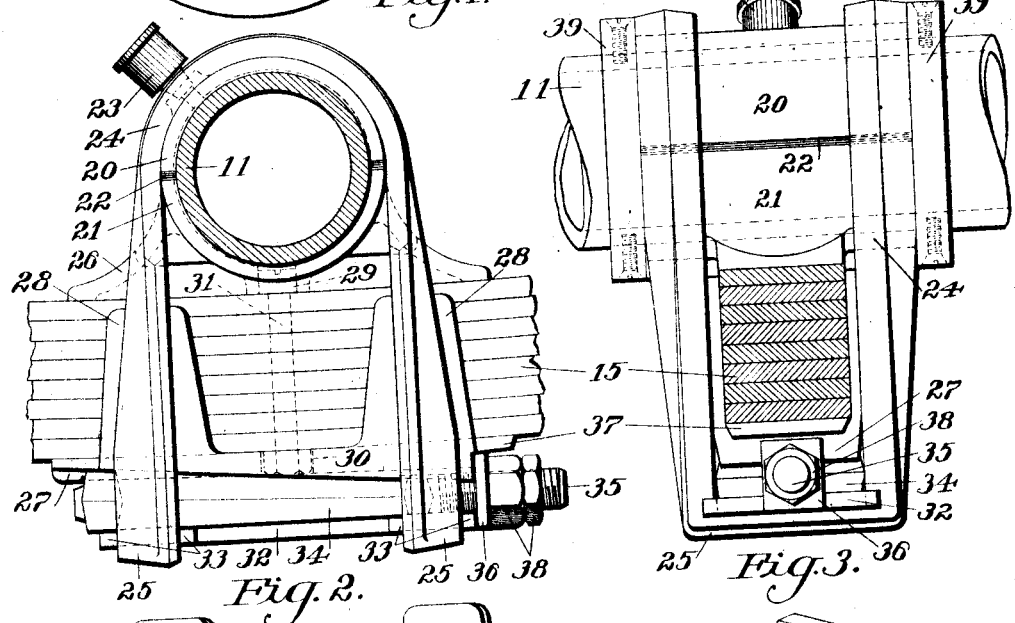
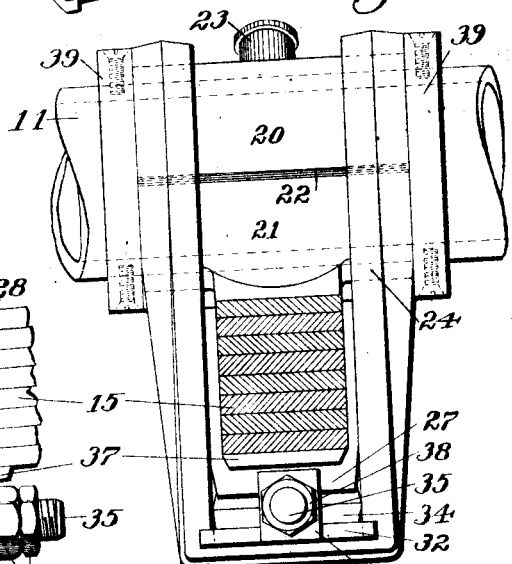
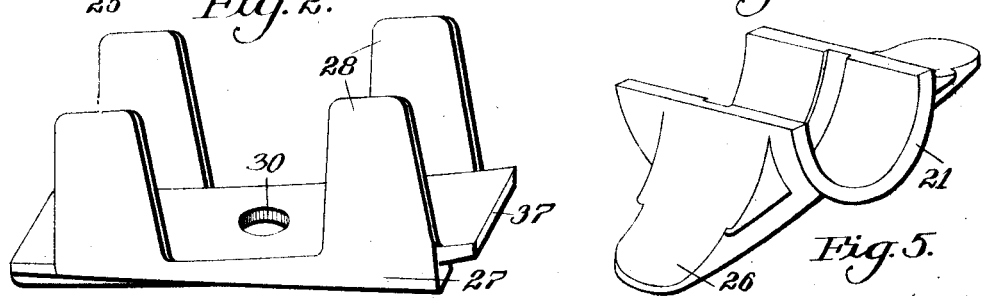
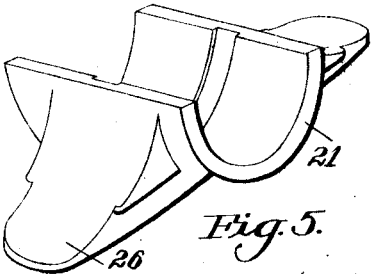

UNITED STATES PATENT OFFICE.

ALLEN LOOMIS, OF DETROIT, MICHIGAN, ASSIGNOR TO PACKARD MOTOR CAR COMPANY, OF DETROIT, MICHIGAN, A CORPORATION OF MICHIGAN.

MOTOR-VEHICLE.

1,189,590.

Specification of Letters Patent.

Patented July 4, 1916.

Application filed October 26, 1912. Serial No. 727,930.

*To all whom it may concern:*

Be it known that I, ALLEN LOOMIS, a citizen of the United States, and resident of Detroit, Wayne county, State of Michigan, have invented certain new and useful Improvements in Motor-Vehicles, of which the following is a specification.

This invention relates to motor vehicles, and particularly to means for securing the springs of vehicles to their supports, such as the axle or frame.

One of the salient objects of the invention is the production of a spring securing means that will effectively hold the spring to its support and at the same time be inexpensive to manufacture.

Another object of the invention is the production of a spring securing means that eliminates the usual shackles with their unsightly projecting ends and nuts.

Another object of the invention is the production of a spring support in the form of a stirrup, which will hang from the supporting means and surround the spring.

Other objects of the invention will be apparent from the following description, taken in connection with the drawings, which form a part of this specification, and in which, Figure 1 is a side elevation of the rear end of a motor vehicle embodying this invention, certain parts being broken away; Fig. 2 is an enlarged transverse section of the axle shown in Fig. 1, illustrating the adaptation of the invention to a spring supported on the vehicle driving axle; Fig. 3 is a front elevation of a portion of the axle shown in Fig. 2, with the spring in section; and Figs. 4, 5, 6 and 7 are views of detail.

Heretofore it has been customary to secure vehicle springs to the axle, or other support, by means of shackles of U shape, which extend around the spring with their ends projecting through pads on the axle, and provided with one or two nuts for each projecting end to secure the spring to the pad. This necessitates tightening four pairs of nuts for each spring securing means, and leaves four unsightly projecting shackle ends. In the present invention, the spring is secured to the pad, or support, by a simple stirrup and a wedge which is tightened lengthwise of the spring by means of a single pair of jam nuts. This makes an extremely effective securing means, and, as designed in this invention, it is simple and inexpensive to manufacture.

Referring to the drawings, 10 represents the rear end of a motor vehicle frame, and 11 is the rear or driving axle, having a forwardly extending torque rod 12, suspended at its forward end in a bracket 13, secured to a cross member of the frame. The frame and axle are also connected by what is known as a three-quarter elliptic scroll spring, comprising the lower part 15 and the upper part 16, the former being secured intermediate its ends to the axle and pivoted at its forward end directly to the frame, as at 17, and the latter, or part 16, being secured to the rear end of the frame at 18 and having its end bent around the rear end of the part 15 and suspended therefrom by a link 19.

By the above arrangement, the driving action of the axle is transferred to the frame through the forward end of the spring part 15, and the torque rod 12 sustains the driving and braking torque of the axle. It will be understood of course that the spring part 15 may be shackled to the frame at 17, and the drive taken through radius rods, or through a properly connected torque rod.

As shown particularly in Figs. 2 and 3, the axle 11 is of tubular form near its ends where the spring is secured to it, and a pair of bushing members 20 and 21 surround the tubular axle at this point, said members being separated by suitable liners, or shims 22, to give proper clearance. A grease cup 23 may be provided in the member 20, for the purpose of keeping these relatively moving parts well lubricated.

So far as the wedge securing device feature of this invention is concerned, any suitable form of spring stirrups may be provided, but the invention, as a whole, is made very simple and complete by the use of the particular spring stirrup shown in this application. This spring stirrup is in the form of a continuous or endless band 24, which is preferably a drop forging, and this band is formed into an elongated rectangle and bent down over the axle or bushing member 20, so that it hangs on either side of the axle in the form of loops 25, as shown clearly in Figs. 2 and 3. This makes an extremely advantageous manufacturing proposition of the spring stirrup and produces a very strong and effective support for the spring.

The lower bushing member 21 has a spring pad 26 formed as an integral part thereof in the present embodiment of the invention, and the upper leaf of the spring 15 rests against this pad. A plate 27, which may be called an adapter plate, and which is shown as being somewhat thicker at one end than at the other, being tapered toward one end, rests against the lower leaf of the spring 15, and has integral ears 28 extending upwardly at either side of the spring. Thus the adapter plate incloses the spring on three sides, and together with the pad, practically surrounds the spring. The pad 26 and the adapter plate 27 are each formed at their middle part with depressions 29 and 30 respectively, the depression 29 being adapted to receive the head of the bolt 31, and the depression 30 being adapted to receive the nut of said bolt, which bolt passes through the spring leaves and secures them together. By this means, the spring is prevented from moving endwise relative to the spring pad and adapter plate. A plate 32 rests in the bottoms of the loops 25 and is provided with lugs 33 at its ends, as shown particularly in Figs. 2 and 7, which lugs project on both sides of the loops 25 and thereby position the plate and hold the loops at the proper distance apart.

Between the plates 27 and 32 is a wedge shaped block 34, which is tapered approximately to the same degree as is the plate 27, and which is formed with a bolt end 35 for drawing it into securing position. A square washer 36 surrounds the bolt end 35 and contacts with the ends of the plates 27 and 32, a lug or projecting end 37 on the plate 27 preventing the turning of the washer 36. Nuts 38 on the bolt end 35 are adapted to draw the wedge 34 toward the right in Fig. 2 and thereby clamp the spring 15 between the loop ends 25 and the pad 26, thus securing the spring under great pressure between these elements.

The bushing members 20 and 21 and the spring stirrups are prevented from being moved endwise on the axle 11 by collars 39, adjustably secured on the axle. The spring is assembled by first placing the bushing members and the stirrup in place, then putting the spring endwise through the loops 25, with the adapter plate 27 and plate 32 in place, and then forcing the wedge block 34 in between the plates 27 and 32 and tightening the wedge by means of nuts 38.

It will be understood that some of the features of this invention are adapted to supporting the spring from the frame, or other parts of the vehicle, as well as from the axle. It will also be understood that other modifications of the invention may be made without departing from the scope thereof.

Having thus described my invention, what I claim and desire to secure by Letters Patent, is,

1. The combination with an axle, and a spring support mounted thereon, said spring support comprising a continuous band having its middle portion bent over the axle and its looped ends extending in parallel on either side of the axle providing stirrups for the spring, of a spring having its end adapted to be inserted in and removed from said stirrup when said support is in place on the axle, and means for securing the spring to the support.

2. A spring securing means comprising a support forming a pair of loops surrounding the spring, a plate extending between the ends of said loops, and a wedge for securing the spring to said support.

3. A spring securing means comprising a support surrounding the spring, an adapter plate surrounding the spring on three sides, and a wedge arranged between a part of the adapter plate and a part of the support for securing the spring to the support.

4. In a vehicle, the combination with the axle and the spring adapted to be supported therefrom transversely of the axle, of a continuous band bent at its middle over the axle and forming loops passing around the spring at either side of the axle, and means for clamping the spring between said loops and the axle.

5. In a vehicle, the combination with the axle and the spring adapted to be supported therefrom transversely of the axle, of a continuous band bent at its middle over the axle and forming loops passing around the spring at either side of the axle, and a wedge device for clamping the spring between said loops and the axle.

6. In a vehicle, the combination with the axle and the spring adapted to be supported therefrom transversely of the axle, of a continuous band bent at its middle over the axle and forming loops passing around the spring at either side of the axle, and means comprising a wedge operating longitudinally of the spring for detachably securing the spring in said loops.

7. In a vehicle, the combination with the axle and the spring, of a support hanging from the axle in the form of separated loops through which the spring extends, of a plate connecting said loops, and a wedge operating on said plate to secure the spring to the support.

8. In a vehicle, the combination with the axle and the spring adapted to be trunnioned thereon, of a support extending over the axle and downwardly in the form of loops surrounding said spring on either side of the axle, a bushing between the axle and the spring, and a wedge adapted to secure the spring rigidly in the loops of the support.

9. In a vehicle, the combination with the axle and the spring adapted to be trunnioned thereon, of a support extending over the axle and downwardly in the form of loops surrounding said spring on either side of the axle, a bushing between the axle and the spring, a plate connecting the bottoms of the loops, and a wedge between the plate and the spring for securing the spring in the loops of said support.

10. In a vehicle, the combination with the axle and the spring adapted to be trunnioned thereon, of a support extending over the axle and downwardly in the form of loops surrounding said spring on either side of the axle, a bushing between the axle and the spring, a plate connecting the bottoms of the loops, a plate directly beneath the spring, and a wedge plate between the two first mentioned plates for securing the spring to said support.

11. In a vehicle, the combination with the axle and the spring adapted to be trunnioned thereon, of a support extending over the axle and downwardly in the form of loops surrounding said spring on either side of the axle, a bushing between the axle and the spring, a plate connecting the bottoms of the loops, a plate directly beneath the spring, a wedge plate between the two first mentioned plates for securing the spring to said support, and means operating against the ends of said plates for tightening said wedge.

12. In a vehicle, the combination with the axle and the spring, of a spring support having a portion surrounding the upper half of the axle and a portion hanging from the axle in the form of loops through which the spring extends, a pair of bushings surrounding the axle, the lower bushing having a plate portion resting on the spring, shims between said bushings to prevent binding of the bushings on the axle, plates under the spring and between it and the loops, and a wedge between said plates for binding the spring in place.

13. In a vehicle, the combination with the axle and the spring, of a spring support having a portion surrounding the upper half of the axle and a portion hanging from the axle in the form of loops through which the spring extends, a plate connecting said loops, a plate beneath said spring and having ears extending upwardly at the sides of said spring, a wedge between said plates, and means operating against the ends of the plates for tightening the wedge and thereby secure the spring in place.

14. In a vehicle, the combination with the axle and the spring, of a spring support having a portion surrounding the upper half of the axle and a portion hanging from the axle in the form of loops through which the spring extends, a plate connecting said loops and having lugs for positioning said loops, a plate beneath said spring, a wedge between said plates, and means operating against the ends of said plates for tightening the wedge and thereby secure the spring in place.

15. In a vehicle, the combination with the axle and the spring, of a spring support having a portion surrounding the upper half of the axle and a portion hanging from the axle in the form of loops through which the spring extends, a pair of bushings surrounding the axle, the lower bushing having a plate portion resting on the spring, shims between said bushings to prevent binding of the bushings on the axle, plates under the spring and between it and the loops, and a wedge between said plates operating lengthwise of the spring and against the ends of the plates for binding the spring in place.

16. In a vehicle, the combination with the axle and the spring, of a spring support having a portion surrounding the upper half of the axle and a portion hanging from the axle in the form of loops through which the spring extends, a pair of bushings surrounding the axle, the lower bushing having a plate portion resting on the spring, shims between said bushings to prevent binding of the bushings on the axle, a plate connecting said loops, a plate beneath said spring and having ears extending upwardly at the sides of said spring, and a wedge between said plates operating against the ends thereof for binding the spring in place.

In testimony whereof I affix my signature in the presence of two witnesses.

ALLEN LOOMIS.

Witnesses:
ALFRED H. KNIGHT,
JOHN D. WILSON.